M. W. W. MACKIE.
DYNAMO ELECTRIC MACHINE FOR MAINTAINING A CONSTANT ELECTROMOTIVE FORCE
UNDER VARIATIONS OF SPEED.
APPLICATION FILED AUG. 24, 1906.
982,377.
Patented Jan. 24, 1911.
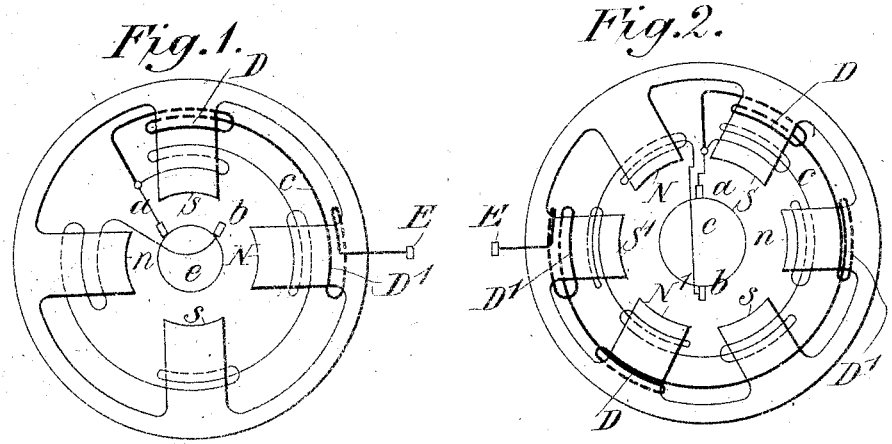
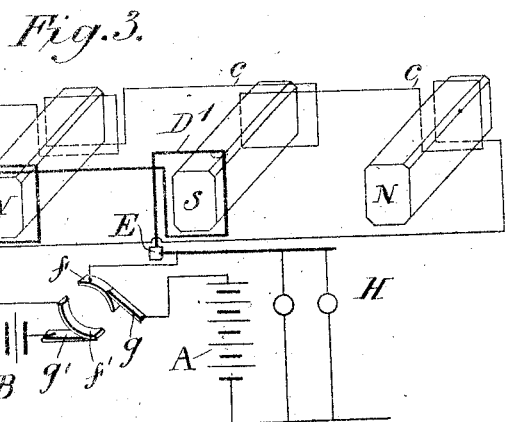
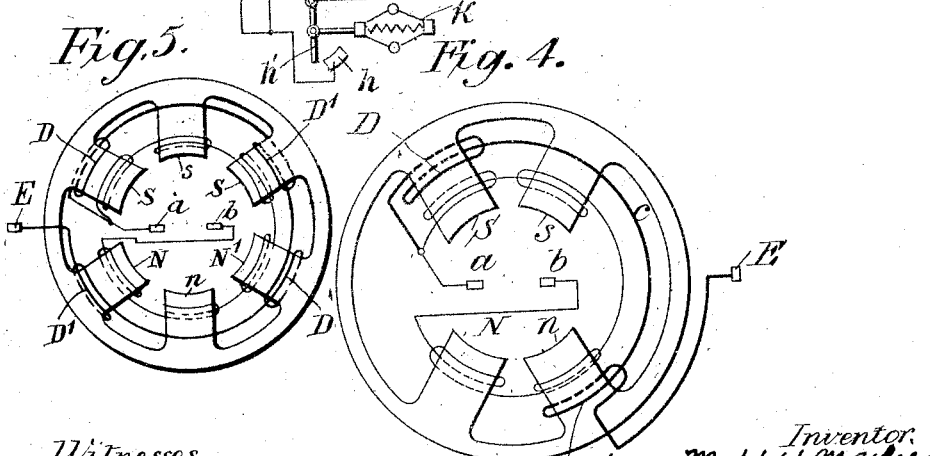

UNITED STATES PATENT OFFICE.

MATTHEW WILLIAM WALBANK MACKIE, OF EALING, ENGLAND.

DYNAMO-ELECTRIC MACHINE FOR MAINTAINING A CONSTANT ELECTROMOTIVE FORCE UNDER VARIATIONS OF SPEED.

982,377.

Specification of Letters Patent.   Patented Jan. 24, 1911.

Application filed August 24, 1906. Serial No. 331,830.

*To all whom it may concern:*

Be it known that I, MATTHEW WILLIAM WALBANK MACKIE, a subject of the King of Great Britain and Ireland, residing at Ealing, in the county of Middlesex, England, have invented Improvements Connected with Dynamo-Electric Machines for Maintaining a Constant Electromotive Force Under Variations of Speed, of which the following is a specification.

This invention relates to improvements in connection with dynamo-electric machines whereby such a machine can, after attaining a certain predetermined speed, corresponding to a desired normal E. M. F. or voltage, be caused to maintain that voltage constant within a very small variation, although the speed may be varied to a considerable extent above such predetermined or normal speed, at which the required voltage is produced, thereby specially adapting such machine to be driven from a railway vehicle for train lighting.

For the purpose of this invention, a multipolar dynamo machine is used wherein all the poles are provided with a shunt winding and some only of them are provided with a demagnetizing or regulating winding (hereinafter referred to as the demagnetizing winding) which is controlled by an accumulator in such manner that the voltage of the dynamo is maintained practically constant even when the dynamo is running above the normal speed at which the required normal voltage is produced, the dynamo at lower speeds than the normal being automatically put out of action.

In carrying out the invention, there are combined with a multipolar shunt wound dynamo electric machine, a demagnetizing winding arranged on some only of its poles, means for opening the circuit of the machine when its speed falls below that necessary for supplying the required voltage, and an accumulator (hereinafter called for distinction the working accumulator) which is connected in series with the demagnetizing winding across the brushes of the machine and also it may be to a work circuit to which the demagnetizing winding would also be then connected. The arrangement is such that under normal conditions of speed, the dynamo will generate the required E. M. F. which may be equal, or nearly so, to or greater than that of the working accumulator. In the latter case the E. M. F. generated may be sufficient to charge a second accumulator arranged in a circuit direct across generated may be sufficient to charge a second accumulator arranged in a circuit direct the brushes of the machine and designed to be interchanged with the other battery to serve as the working battery. In either case the demagnetizing winding is made of such resistance that, at the normal speed and voltage of the dynamo, only a very small current will flow through it so that the magnetic poles on which it is arranged will be practically unaffected by such current, the voltage drop in the winding, at the said normal voltage, together with the E. M. F. of the working accumulator, being practically equal to the normal voltage. Under such normal conditions, if the working accumulator and demagnetizing winding be connected at a point between them to a work circuit, any current required for such work circuit will be mainly supplied by the working accumulator. Upon the speed, and consequently the voltage of the machine, rising above the normal, the current flowing through the demagnetizing winding will be increased and act to more or less demagnetize the poles upon which it is wound, in such manner that the voltage of the machine will be prevented from rising, except to a small permissible extent, say half a volt, above the normal voltage, while upon the speed of the machine falling below the normal, that is to say to an amount insufficient to charge the second accumulator or connected directly across the brushes of the machine, if a second accumulator be used the circuit of the machine will be automatically opened by the means provided for that purpose, the working accumulator in the latter case being then wholly relied upon for supplying any current required for the work circuit.

The accompanying drawings show examples of various methods or means whereby the system of demagnetization of some of the magnet poles of a dynamo electric machine, as above set forth, is utilized to effect the required governing action upon variation of speed of the machine from the normal speed, Figures 1 and 4 being diagrams of four pole shunt wound generators and Figs. 2 and 5 similar diagrams of six pole shunt wound generators showing different embodiments of the invention. Fig. 3 is a diagram showing the circuit connections for a generator such as is shown in Fig. 1.

The main shunt winding may be arranged on the poles of the machine in any well known way, the shunt winding, applied to the four alternate magnet poles S N s n in Fig. 1, being shown by a thin line and marked $a\ b\ c$. The demagnetizing winding, shown, for distinction as a thick line, is wound upon half the number of pairs of poles, as represented at $D\ D^1$. In the case of a six pole machine, as shown in Fig. 2, four of the six poles may be wound with the demagnetizing winding $D\ D^1$, leaving the remaining two poles wound with the shunt winding $a\ b\ c$ only.

The armature $e$ employed in each of the arrangements shown in Figs. 1 and 2, is an ordinary series or wave wound armature, and the shunt winding $a\ b\ c$ is connected across the brushes $a, b$ in the usual manner. One end of the demagnetizing winding $D, D^1$ is connected to one brush, viz. $a$, the other end of such winding being connected to the circuit terminal E. The method of governing by the aid of the said demagnetizing winding $D\ D^1$ for maintaining a practically constant E. M. F. between the brushes of the machine is shown in Fig. 3. In this example, which is suitable for train lighting, a set of electric accumulator cells A and electric lamps H are connected between the circuit terminal E and the second brush $b$ of the armature $e$, and another set of electric accumulator cells B is connected directly across the two brushes $a\ b$ of the machine.

The set of accumulator cells A is designed to give an E. M. F. of the predetermined required amount for working the lamps H, and a counter E. M. F. necessary to regulate the demagnetizing winding $D\ D^1$ which is made of such dimensions that only a small current will flow through it at normal voltage so that the winding will be practically inoperative upon the poles of the machine upon which it is placed, and so that the voltage drop in the said winding at such normal voltage, plus the voltage of the set of accumulator cells A, will practically be equal to the normal voltage of the machine, as hereinbefore set forth. The set of accumulator cells B is designed to give the same E. M. F. on discharge as the set A and being connected across the brushes $a\ b$ can be charged by the machine in readiness for use in lieu of the set A when these have been discharged. To enable the cells B to be charged, the normal voltage of the machine generated at a given predetermined speed, must therefore be greater than that of the cells A which are being used for regulating and current supply purposes. A device of any known or suitable kind may be provided for causing the two sets of accumulators to change places at suitable intervals, the set that is, for the time being, between the terminal E and brush $b$ not being changed over until after the other set has been connected across such terminal E and brush $b$. For this purpose, the terminal E may be connected to one segmental contact $f$ of a battery interchanging switch while the brush $a$ is connected to a second segmental contact $f^1$ of the said switch, the co-acting brushes $g, g^1$ being respectively connected to the positive pole of the accumulator A and the positive pole of the accumulator B. The negative poles of the two accumulators A and B are arranged to be connected to the negative brush $b$ of the machine through a second switch or automatic cut-out comprising a fixed contact $h$ connected to the brush $b$ and a movable contact $h^1$ controlled by a centrifugal speed governor $k$ driven from the shaft or axle used for rotating the armature of the dynamo machine. The said cut out serves to open the dynamo circuit when the speed of the armature falls below that necessary for supplying the normal voltage necessary for charging the secondary battery connected across the brushes of the machine. By partial rotation of the contacts $f, f^1$ of the interchanging switch when the machine is running at or above its normal speed, contact $g$ will be connected to contact $f^1$ and contact $g^1$ to contact $f$ so as to respectively connect the accumulator A across the brushes $a, b$ and the accumulator B between the terminal E and brush $b$, thus interchanging the two accumulators. The brushes $a, b$ can of course be connected to any additional work circuit, if desired.

The governing action of the arrangement is as follows:—When the machine is running at a certain predetermined speed, its E. M. F. will be the normal E. M. F. required to commence charging the set of accumulator cells B across the brushes $a\ b$, and which it is the object of the invention to maintain practically constant at speeds above the said predetermined speed, the resistance of the demagnetizing winding $D\ D^1$ being so proportioned, as hereinbefore stated, that at this time very little current will flow through such winding and the second set of accumulator cells A connected in series with it across the brushes $a\ b$. The field magnet poles and the armature of the machine will then act as in an ordinary shunt wound machine and charge the set of accumulator cells B, the accumulator A meanwhile acting, if necessary, to supply the lamps H with current independently of the dynamo machine, and also to oppose a counter E. M. F. to the direct E. M. F. in the demagnetizing winding so that very little current will flow through the said winding at this time to the work circuit. When the speed of the machine increases beyond the predetermined speed and the E. M. F. of the machine consequently rises slightly above the predetermined normal value, a greater current will flow through the demagnetizing winding D D¹ in opposition to the counter E. M. F. of the accumulator A, and in a direction to more or less demagnetize half (or more at will) of the magnet poles, with the result that the electromotive force generated in half (or less) of the conductors on the armature will be diminished to the extent of the demagnetization, or a counter E. M. F. may even be produced in opposition to the E. M. F. generated in those conductors on the armature that are, at the moment, passing under the magnet poles that have not been demagnetized. At this time the larger current flowing through the demagnetizing winding D D¹ is utilized to charge the accumulator A, or to work the lamps H. When the speed of the machine falls below the predetermined normal speed, the dynamo circuit through the secondary battery B between the brushes $a$ and $b$ will, as usual, be automatically opened by the speed governor $k$, such circuit being again automatically closed when the speed attains the normal value.

By the means described a practically constant E. M. F. can be maintained between the brushes $a$ and $b$ which, as before stated, can be connected to the work circuit including the set of accumulator cells B or any other electric translating devices. The use, as set forth, of an electric accumulator, such as A, in series with a demagnetizing winding for maintaining a practically constant E. M. F. in a dynamo-electric machine notwithstanding variation of speed above the normal, in conjunction with another similar accumulator arranged to be charged by the machine while the other is in use and to be substituted therefor when discharged, constitutes an important feature of this invention.

By placing the demagnetizing winding on some only of the poles of the machine, as described, part of the magnetic field of the dynamo will be unaffected so that commutation can take place in a field of practically constant strength and so avoid any sparking troubles. For this reason, the field of the poles to which the demagnetizing winding is applied can not only be weakened but even reversed, in which case, part of the armature will act as a generator and part as a motor, thereby enabling the E. M. F. of the machine to be maintained practically constant within considerable ranges of speed variation above the normal speed.

Fig. 4 shows another arrangement of demagnetizing winding, as applied to a drum or lap wound machine having four poles, and Fig. 5 such a winding as applied to a similar machine having six poles. In the first case, two poles carry the demagnetizing winding leaving two poles free, and in the second case four poles are arranged to be demagnetized and two left free, the arrangement in each case being such as to produce a symmetrical field.

What I claim is:—

1. In an electric supply system, the combination with a multipolar dynamo having a shunt magnetizing winding, of a demagnetizing winding arranged on some only of the magnetic poles of the machine, an accumulator and means connecting the said accumulator in series with said demagnetizing winding and in parallel with the shunt magnetizing winding, the resistance of the demagnetizing winding in conjunction with the E. M. F. of the accumulator being adapted to maintain the required voltage of the dynamo at a critical or predetermined speed of the dynamo and permit of only a small current traversing such winding at such speed and a greater and demagnetizing current when such critical speed is exceeded, for the purpose set forth.

2. In an electric supply system, the combination with a work circuit, of a multipolar dynamo having a shunt magnetizing winding on all its poles and a demagnetizing winding on some only of its poles, one end of the latter winding being connected to one of the two terminals of the machine between which it is desired to maintain a practically constant electromotive force when the machine is running at or above a predetermined speed, and an accumulator having one terminal connected to the second end of said demagnetizing winding and to one side of the work circuit and having its other terminal connected to the second side of the work circuit and adapted to be connected to the second terminal of the machine, the combined resistance of the demagnetizing winding and the E. M. F. of the accumulator allowing only of a small current flowing through said demagnetizing winding when the voltage of the machine is normal.

3. In an electric supply system, the combination with a work circuit and a multipolar dynamo having a magnetizing winding on all its poles, of a demagnetizing winding arranged on some only of said poles and in parallel with the magnetizing winding, an accumulator simultaneously supplying the work circuit and acting in opposition to the dynamo through the demagnetizing winding, the E. M. F. of the said accumulator combined with the resistance of the demagnetizing winding allowing only a small and practically inoperative current to flow in the said demagnetizing winding while the normal voltage of the dynamo obtains and a greater and regulating current when the speed of the machine exceeds the normal, for the purpose set forth.

4. In an electric supply system, the combination with a work circuit and a multipolar dynamo having a magnetizing winding on all its poles, of a demagnetizing winding arranged on some only of said poles and in parallel with the magnetizing winding, an accumulator connected in circuit with one terminal between the demagnetizing winding and one end of one side of the work circuit and with the other terminal between one brush of the dynamo and the corresponding end of the other side of the work circuit, so as to impress a voltage upon the demagnetizing winding in opposition to the voltage of the dynamo, the resistance of the demagnetizing winding permitting only a small and practically inoperative current to flow through the said winding until the normal speed and voltage of the dynamo is slightly increased when a greater current, acting to demagnetize more or less the poles upon which it is placed, will flow through said winding.

5. In an electric supply system, the combination with a work circuit, and a multipolar dynamo having a magnetizing winding on all its poles, of a demagnetizing winding on some only of the said poles, an accumulator connected in series with the demagnetizing winding simultaneously supplying the work circuit and acting in opposition to the voltage of the dynamo through such demagnetizing winding, and a similar accumulator directly connected across the armature of the dynamo to enable it to be charged at the required voltage of the machine while the other is discharging at a lower voltage.

6. In an electric supply system, the combination of a dynamo having magnetizing and demagnetizing windings connected in parallel, the demagnetizing winding being on some only of the magnetic poles of the machine, a work circuit one side of which is connected to one terminal of the dynamo through the demagnetizing winding while the other side is arranged to be connected to the other terminal of the dynamo, an accumulator connected to said work circuit and adapted to allow only of the demagnetizing winding being traversed by a small and practically inoperative current while the voltage of the dynamo is normal, a second accumulator arranged in a separate circuit connected across the terminals of the dynamo and adapted to be charged in said separate circuit at the normal voltage of such dynamo while the other charged accumulator is discharging at a lower voltage, and means for interchanging said accumulators.

7. An electric supply system comprising, in combination, a multipolar dynamo having magnetizing and demagnetizing windings connected in parallel, the demagnetizing winding being on some only of the magnetic poles of the machine, a work circuit having one side connected with the demagnetizing winding, an accumulator having one terminal connected between the demagnetizing winding and said work circuit and its other terminal connected to the other side of the work circuit and adapted to be connected to the terminal of the dynamo opposite to that to which the demagnetizing winding is connected, an accumulator, similar to the accumulator aforesaid, located in a circuit directly supplied by the generator and means for interchanging such accumulators.

8. In an electric supply system, the combination with multipolar shunt wound dynamo and means for opening the circuit thereof when its speed falls below a given normal speed, of a demagnetizing winding arranged on some only of the poles of such dynamo and having one end connected to one of the terminals of the machine, an accumulator connected to the second end of the demagnetizing winding and means for connecting the said accumulator to the second terminal of the dynamo, a work circuit connected to a point between the demagnetizing winding and accumulator and to the second terminal of the accumulator, a second accumulator connected directly across the terminals of the dynamo, and means for interchanging the accumulators, substantially as described.

Signed at London England this 20th day of July 1906.

MATTHEW WILLIAM WALBANK MACKIE.

Witnesses:
H. D. JAMESON,
R. F. WILLIAMS.